(12) United States Patent
Eksteen et al.

(10) Patent No.: US 9,817,891 B1
(45) Date of Patent: Nov. 14, 2017

(54) SYSTEM, METHOD, AND COMPUTER PROGRAM FOR CREATING METADATA-BASED SEARCH QUERIES

(71) Applicant: Amdocs Software Systems Limited, Dublin (IE)

(72) Inventors: Petrus Johannes Eksteen, Holt (GB); James Francis Hunt, Bristol (GB); Jason Edward Gibbons, Saltford (GB); Johnston Harden Graham Glendinning, Holywood (IE); Christopher Mark Bagnall, Bath (GB); Tian Cheng Lee, Bath (GB)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 614 days.

(21) Appl. No.: 14/185,807

(22) Filed: Feb. 20, 2014

Related U.S. Application Data

(60) Provisional application No. 61/807,800, filed on Apr. 3, 2013.

(51) Int. Cl.
*G06F 17/30* (2006.01)

(52) U.S. Cl.
CPC .. *G06F 17/30699* (2013.01); *G06F 17/30657* (2013.01)

(58) Field of Classification Search
CPC .............. G06F 17/30699; G06F 17/30657
See application file for complete search history.

(56) References Cited

U.S. PATENT DOCUMENTS

2003/0195880 A1* 10/2003 Mancinelli ........ G06F 17/30398
2008/0271080 A1* 10/2008 Gossweiler ........... G06F 3/0486
725/47

* cited by examiner

*Primary Examiner* — Taelor Kim
(74) *Attorney, Agent, or Firm* — Zilka-Kotab, PC

(57) ABSTRACT

A system, method, and computer program product are provided for creating metadata-based search queries. In use, a plurality of data objects in one or more databases are identified. Additionally, a plurality of attributes associated with each of the plurality of data objects are identified (e.g. attributes from a table, derived attributes, etc.). Further, a plurality of relationships associated with each of the plurality of data objects are identified. In addition, at least one of the plurality of data objects, the plurality of attributes, or the plurality of relationships are filtered to generate a first subset of data objects, a first subset of attributes, and a first subset of relationships. At least a metadata representation of at least a portion of the first subset of data objects, the first subset of attributes, or the first subset of relationships is displayed utilizing a user interface. Furthermore, a selection is received from the user interface, the selection including data associated with one or more of the first subset of data objects, one or more of the first subset of attributes, or one or more of the first subset of relationships. Moreover, a search query is automatically generated based on the selection. Additionally, the one or more databases are searched utilizing the search query. Still yet, results of the search query are displayed utilizing the user interface.

14 Claims, 11 Drawing Sheets

SYSTEM, METHOD, AND COMPUTER PROGRAM FOR CREATING METADATA-BASED SEARCH QUERIES

CLAIM OF PRIORITY

This application claims the benefit of U.S. Provisional Application No. 61/807,800, filed Apr. 3, 2013, the entire contents of which are incorporated herein by reference.

FIELD OF THE INVENTION

The present invention relates to database systems, and more particularly to generating queries utilizing metadata associated with such database systems.

BACKGROUND

Historically, query driven database searches have resulted in one of two implementation patterns. One implementation pattern includes pre-defined queries that are tested and hence protect the system from over-ambitious queries. This type of implementation restricts what users can do with queries.

Another implementation pattern includes user-built queries that ostensibly allow users to search for whatever they request. However, these user-built queries often result in performance and response issues, due to the propensity to execute non-optimal queries.

There is thus a need for addressing these and/or other issues associated with the prior art.

SUMMARY

A system, method, and computer program product are provided for creating metadata-based search queries. In use, a plurality of data objects in one or more databases are identified. Additionally, a plurality of attributes associated with each of the plurality of data objects are identified (e.g. attributes from a table, derived attributes, etc.). Further, a plurality of relationships associated with each of the plurality of data objects are identified. In addition, at least one of the plurality of data objects, the plurality of attributes, or the plurality of relationships are filtered to generate a first subset of data objects, a first subset of attributes, and a first subset of relationships. At least a metadata representation of at least a portion of the first subset of data objects, the first subset of attributes, or the first subset of relationships is displayed utilizing a user interface. Furthermore, a selection is received from the user interface, the selection including data associated with one or more of the first subset of data objects, one or more of the first subset of attributes, or one or more of the first subset of relationships. Moreover, a search query is automatically generated based on the selection. Additionally, the one or more databases are searched utilizing the search query. Still yet, results of the search query are displayed utilizing the user interface.

BRIEF DESCRIPTION OF THE DRAWINGS

FIG. 5 illustrates a user interface for metadata-driven search and display, in accordance with one embodiment.

FIG. 11 illustrates a user interface for search display both normal and "derived" attributes as criteria and results, in accordance with one embodiment.

DETAILED DESCRIPTION

Figure 1:
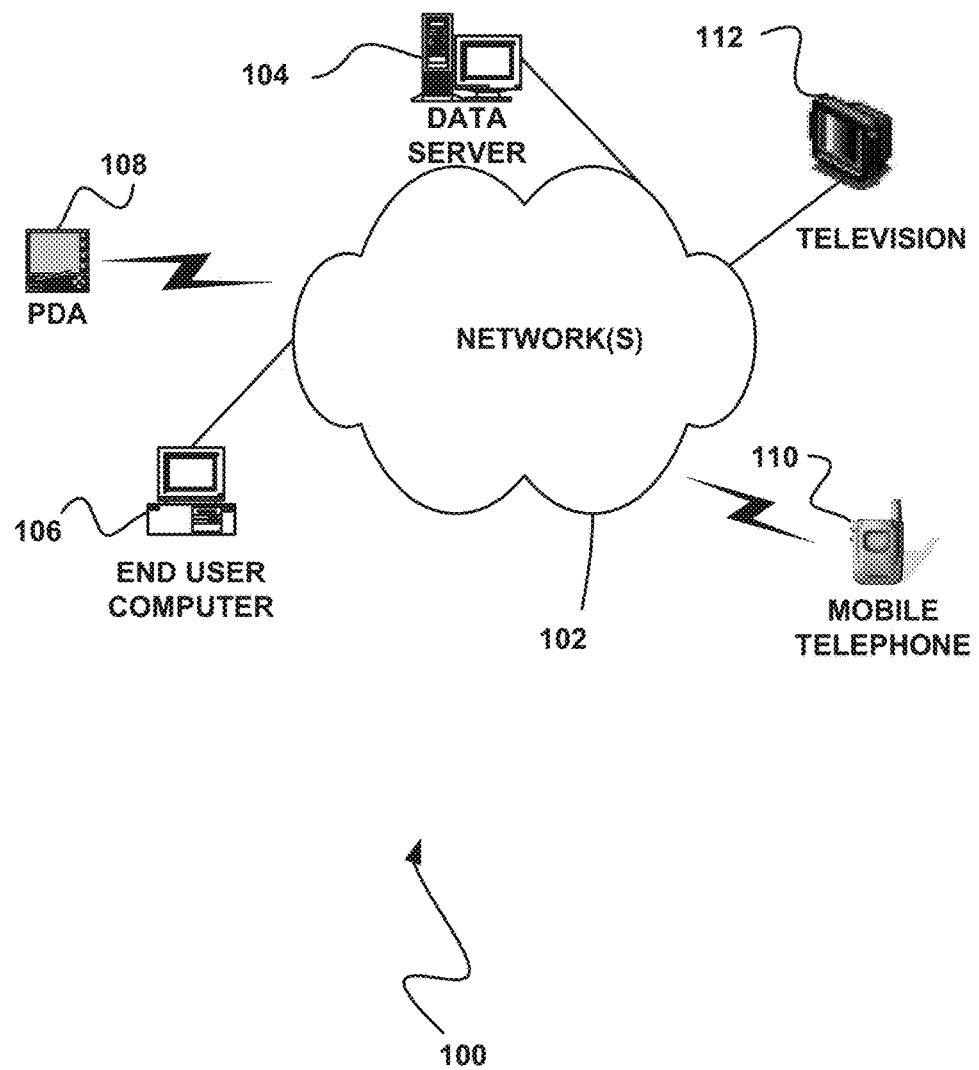
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
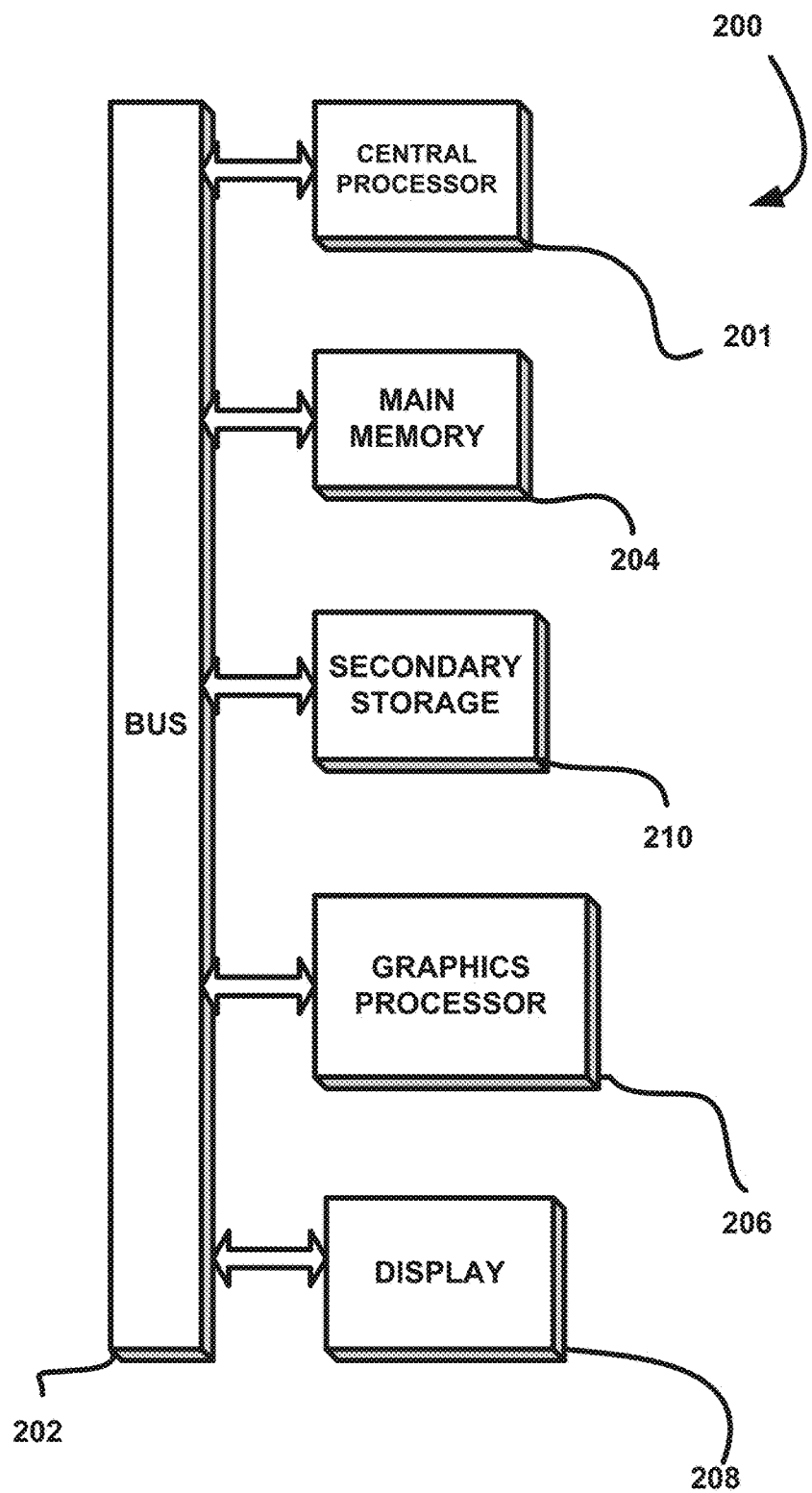
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
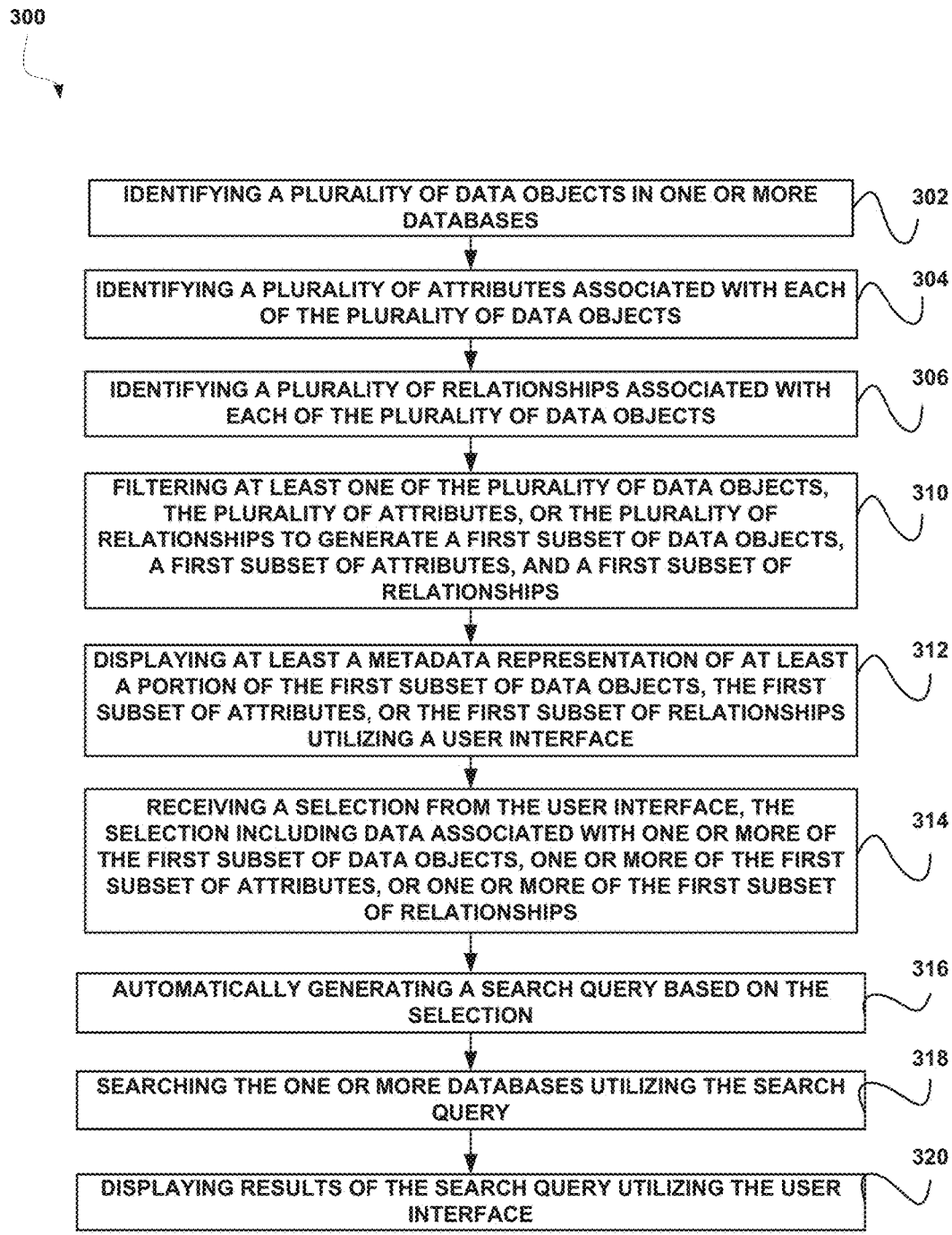
FIG. 3 illustrates a method for creating metadata-based search queries, in accordance with one embodiment.

FIG. 3 illustrates a method 300 for creating metadata-based search queries, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a plurality of data objects in one or more databases are identified. See operation 302. The data objects may include any data stored in the databases. For example, in one embodiment, the data objects may include data objects associated with tables, nodes, data structures, and/or any other data. In one embodiment, the identified data objects may include data objects that are capable of being viewed and/or queried.

The one or more databases may include one database or a plurality of databases. Further, the database(s) may be associated with any type of system. For example, in one embodiment, the database(s) may be associated with a telecommunications system. In another embodiment, the database(s) may be associated with a billing system.

Additionally, a plurality of attributes associated with each of the plurality of data objects are identified. See operation 304. The attributes may include any attribute associated with a data object. For example, the attributes may include characteristics associated with the data objects, a type of the data objects, a size of the data objects, a location of the data objects, and/or any other type of information. In one embodiment, the attributes may include attributes that are capable of being viewed and/or queried. In another embodiment, the attributes may include configurable attributes.

In various embodiments, identifying the attributes may include identifying attributes in a table associated with a corresponding object, identifying attributes of a first object that may be used for a second different object, and/or calculating the attributes (e.g. on the fly). In any of these cases, the origin of the attributes will be transparent for their intended purpose, which as described in further detail below includes contributing to the generation of a first subset of data objects. In other words, an origin of the attributes will be indistinguishable to a user.

For example, within a database, tables may store object information. As an example, each row may represent an object, and each column may represent an attribute.

In addition to the table including attributes, attributes may be derived, thus allowing extension of an object by adding new "attributes" that are taken from related objects or calculated in some manner. These derived attributes are not necessarily stored in the table that contains the object itself, as they are calculated on the fly. Moreover, the derived attributes may not have been necessarily originally associated with a corresponding object.

Further, a plurality of relationships associated with each of the plurality of data objects are identified. See operation 306. In one embodiment, the relationships may include relationships between objects. For example, the relationships may include information about parent objects, child objects, sibling objects, and/or various other relationship information.

In various embodiments, the relationships may include multi-step relationships and/or configurable relationships. Further, in one embodiment, the plurality of relationships associated with each of the plurality of data objects may include a relationship between a first data object of the plurality of data objects and a second data object of the plurality of data objects.

In addition, at least one of the plurality of data objects, the plurality of attributes, or the plurality of relationships are filtered to generate a first subset of data objects, a first subset of attributes, and a first subset of relationships. See operation 310. In various embodiments, the data may be filtered based on input received from a user interface, user defined preferences, security configurations, administrator preferences, and/or based on various other criteria.

For example, in one embodiment, filtering the at least one of the plurality of data objects, the plurality of attributes, or the plurality of relationships to generate the first subset of data objects, the first subset of attributes, and the first subset of relationships, may be based, at least in part, on a user preference. In another embodiment, filtering the at least one of the plurality of data objects, the plurality of attributes, or the plurality of relationships to generate a first subset of data objects, a first subset of attributes, and a first subset of relationships may include utilizing user defined criteria to generate the first subset of data objects, the first subset of attributes, and the first subset of relationships. In one embodiment, the user defined criteria may be defined utilizing a user configuration interface.

In another embodiment, the plurality of data objects, the plurality of attributes, and/or the plurality of relationships may be filtered based on a blacklist. As another option, the plurality of data objects, the plurality of attributes, and/or the plurality of relationships may be filtered based on a whitelist.

As shown further in FIG. 3, at least a metadata representation of at least a portion of the first subset of data objects, the first subset of attributes, or the first subset of relationships is displayed utilizing a user interface. See operation 312. The metadata representation may include any representation of the first subset of data objects, the first subset of attributes, and/or the first subset of relationships. For example, in one embodiment, the metadata representation may be formatted to illustrate relationships between the first subset of data objects, the first subset of attributes, and/or the first subset of relationships.

In one embodiment, displaying the metadata representation of at least a portion of the first subset of data objects, the first subset of attributes, or the first subset of relationships utilizing the user interface may include displaying a first data object and a plurality of first attributes associated with the first data object. Additionally, in one embodiment, displaying the metadata representation of at least a portion of the first subset of data objects, the first subset of attributes, or the first subset of relationships utilizing the user interface may further include displaying relationship information associated with the first data objects and one or more second objects.

With further reference to FIG. 3, a selection is received from the user interface, the selection including data associated with one or more of the first subset of data objects, one or more of the first subset of attributes, or one or more of the first set of relationships. See operation 314. Moreover, a search query is automatically generated based on the selection. See operation 316.

Additionally, the one or more databases are searched utilizing the search query. See operation 318. Still yet, results of the search query are displayed utilizing the user interface. See operation 320.

In one embodiment, displaying the metadata representation of at least a portion of the first subset of data objects, the first subset of attributes, or the first subset of relationships utilizing the user interface may include displaying one of a first list or a first dropdown list including at least a portion of the first subset of data objects. In this case, a selection of a first data object from the at least a portion of the first subset of data objects may be received. Further, one of a second list or a second dropdown list including a first plurality of attributes of the first subset of attributes that are associated with the first data object may be displayed, in response to receiving the selection of the first data object.

In one embodiment, a selection of at least one of the first plurality of attributes may be received. In this case, the search query may be automatically generated based on receiving the selection of the at least one of the first plurality of attributes. Further, the one or more databases may be searched utilizing the search query and the results of the search query may be displayed utilizing the user interface.

In one embodiment, the results of the search query may be displayed in a selectable format utilizing the user interface. In this case, a selection of the results of the search query in the selectable format may be received from a user utilizing the user interface. Accordingly, additional information associated with the results of the search query may be displayed.

It should be noted that, in one embodiment, the user interface may be configurable such that the results of the search query are based on a user defined preference. In another embodiment, the user interface may be configurable such that displaying the metadata representation is based on a user defined preference.

In operation, the method 300 may be implemented by a system for data search and display using a coherent and configurable metadata-driven approach, including object/attribute/relationship display and ordering, protection against unselective queries, and security-based data hiding. As noted, in one embodiment, user preferences profiles may further be utilized to display the results in manner preferential to a user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
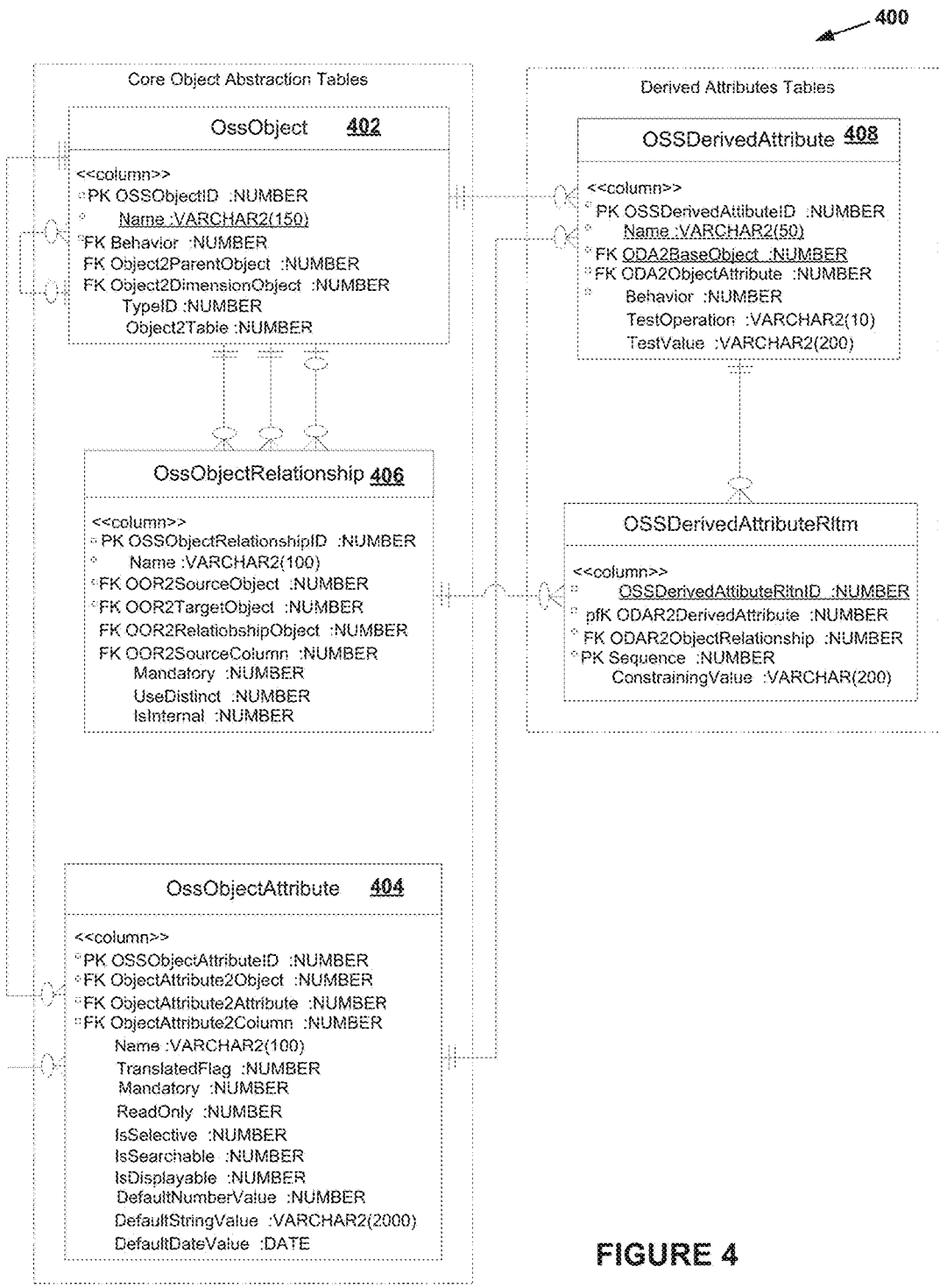
FIG. 4 illustrates a metadata table model capable of being utilized to drive search features, in accordance with one embodiment.

FIG. 4 illustrates a metadata table model 400 capable of being utilized to drive search features, in accordance with one embodiment. As an option, the model 400 may be implemented in the context of the details of FIGS. 1-3. Of course, however, the model 400 may be implemented in the context of any desired environment. Further, the aforementioned definitions may equally apply to the description below.

FIG. 4 shows meta-model artifacts capable of being utilized to drive search features in accordance with one example. As an example, an object table 402 may be generated that contains details of all artifacts representing instances and metadata entities in a system. This may also include objects that provide relationship information.

As another example, an object attribute table 404 may be generated that specifies which searchable attributes are available for which entities and the precise columns that implement those attributes. Further, an object relationship table 406 may be generated that specifies which searchable relationships are available.

Additionally, one or more derived attribute tables 408 may be generated that include configured attributes that appear in a user interface as belonging to a class of objects, but which may be stored elsewhere (if at all) in the database.

In one embodiment, utilizing the metadata table model 400 will allow for a system to implement a coherent configurable metadata-driven search and display, including object/attribute/relationship display and ordering, protection against unselective queries, and security-based data hiding. Further, such system may function to use queries dynamically generated from configurable metadata, and abstracted from the user for retaining power and control. Additionally, such system may further allow filtering for security and personalization.

Utilizing configurable meta-model-driven queries allows for delivery of an intuitive user interface for finding information that may not be uniquely identifiable by name, or whose ID is not known. In one embodiment, this may include utilizing an incremental and context sensitive search/filter mechanism.

In various embodiments, various rich search capabilities may be supported, such as multi-step relationships and/or configurable relationships. Further, in one embodiment, attributes may be returned with the objects. As an option, these attributes may be configurable and/or be able to be saved. Additionally, in one embodiment, a user interface for generating the search and displaying the results may allow a user to step back and step forwards to reconfigure a search.

The metadata table model 400 may support these features, where the model details what objects look like and how the objects relate to one another. In one embodiment, the metadata table model 400 may capture a variety of information for implementing such functionality. Moreover, a user interface for generating the search query may utilize any of the model information (e.g. by presenting it to a user, etc.).

For example, a list of all base objects in a system that is available may be available via the metadata table model 400. Further, a list of all attributes for those objects may be available. Additionally, a list of relationships between objects may be available.

As another example, a column name, data type and length may be available for every column storing an attribute. In one embodiment, the metadata table model 400 may present the ability to determine if a given column forms part of a primary or foreign key. In another embodiment, the metadata table model 400 may offer the ability to obtain a list of all columns in a table. Additionally, utilizing a user interface, a user may have the ability to mark an attribute as mandatory, read-only, or selective on a per object basis. In one embodiment, the user interface may offer the ability to vary the order in which attributes are displayed, on a per object basis. Further, the metadata table model 400 may offer the ability to define the possible values of an attributes by enumeration, status, and/or metadata.

In the context of FIG. 4, the object table 402 may contain details of all the objects representing instance and metadata objects in the system. This includes objects that provide relationship information.

The object attribute table 404 may specify which attributes are available for which objects and the precise columns that implement those attributes. It may also specify if the attribute is mandatory, read only, selective, displayable (e.g. the attribute is available for selecting for display purposes in display sets/preferences, etc.), searchable (e.g. the attribute is available for selecting as a search criterion in display sets/preferences, etc.), and/or whether an attribute is translated in the view.

The object relationship table 406 may specify what relationships are available. The object relationship table 406 may provide information such as a name, a source object, a target object, an optional relationship object for additional properties about the relationship, information about whether or not this relationship is mandatory, information about whether or not multiple rows for a single target object can be returned as a result of following this relationship, and/or information about whether this is an internal only relationship (i.e. a relationship that may be used for setting up derived attributes but is not available for selecting for display purposes in display sets/preferences, etc.).

Additionally, the derived attribute table 408 may include a configured attribute that appears in the user interface as belonging to a class of object, but it may be stored elsewhere (if at all) in the database. For example, derived attributes may include an aggregated attribute, which is an attribute that is moved from one object to another or transformed from a name/value pair into a simple attribute. As another example, the derived attribute may include an attribute that is pulled from one object for presentation as part of another object (e.g. seeing the location name as an attribute of a node, etc.).

As another example, the derived attributes may include an attribute that can only be used as search criteria. For example, this attribute may not have its value displayed because too much contextual information may be lost (e.g. a terminating node on a link, etc.). The derived attributes may further include an attribute that, when a value is displayed, provides a hyperlink to that object.

As another example, the derived attributes may include a simple calculated attribute, using base SQL functionality to calculate an attribute that does not actually exist. The derived attributes may further include an attribute that indicates the existence of data. For example, such attribute may indicate whether a node has ports that can accept links.

As another example, the derived attributes may include an attribute that indicates the lack of existence of data. For example, the attribute may indicate an IP address that is not associated with a port. As another example, the derived attributes may include a complex calculated attribute, using custom code to calculate a new attribute. One example of how the meta-model of FIG. 4 may be used is shown in FIG. 5.

Figure 5:
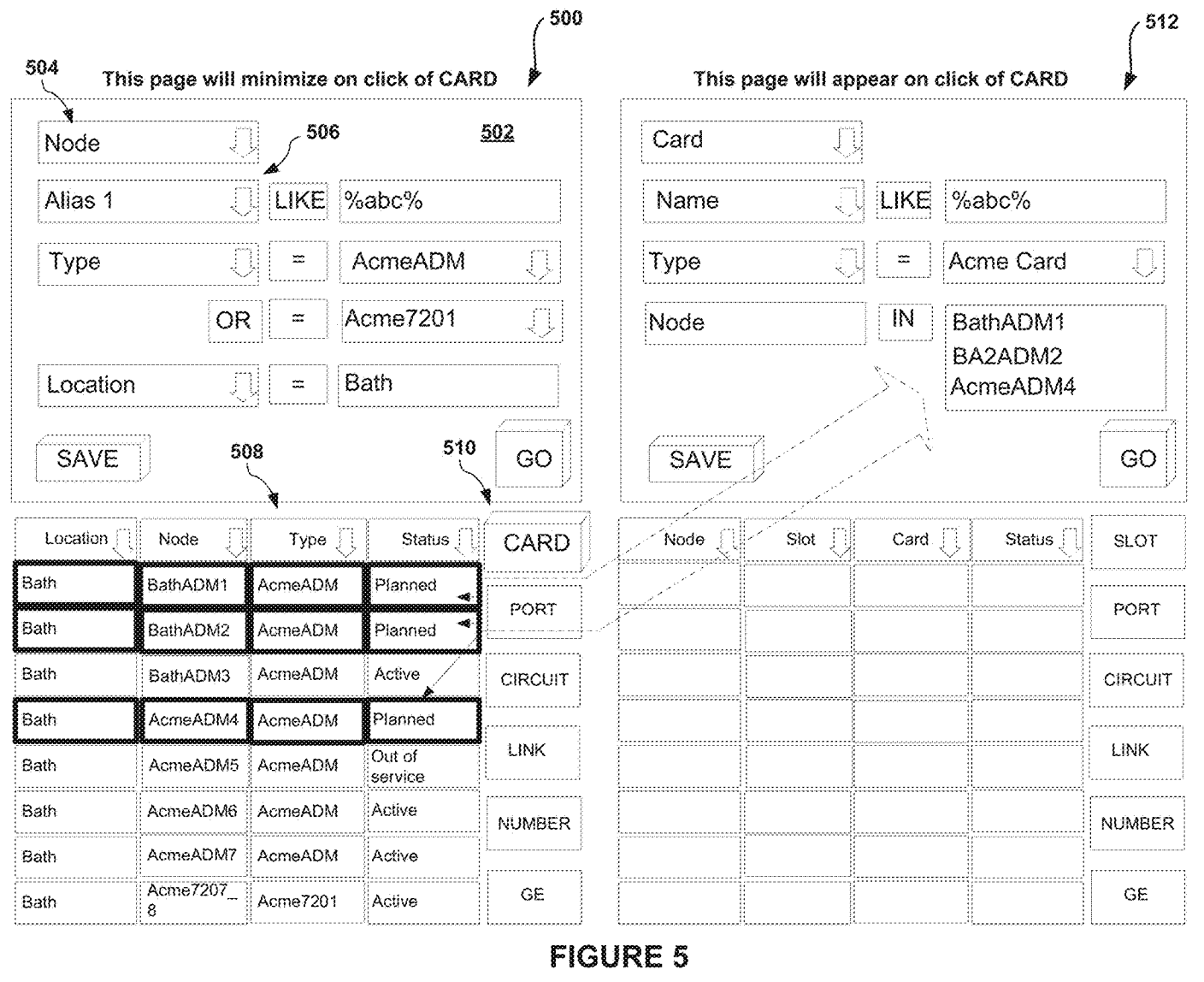

FIG. 5 illustrates a user interface 500 for metadata-driven search and display, in accordance with one embodiment. As an option, the user interface 500 may be implemented in the context of the details of FIGS. 1-4. Of course, however, the user interface 500 may be implemented in the context of any desired environment. Further, the aforementioned definitions may equally apply to the description below.

FIG. 5 shows an example of a meta-data-driven search and display and how meta-model information is used to propose context dependent search features. At startup, a search screen 502 may be empty except for a list of object classes. Upon selection of an object class (e.g. Node 504, etc.), a list of selectable attributes 506 is presented to a user. In one embodiment, the objects that appear for each user may be configurable by the user using a configuration user interface.

Utilizing the search screen 502, the user may set the attributes desired (e.g. Alias1 LIKE '% abc %' and location=Bath, etc.) to use in the search query. The user may click "GO" to initiate the search. In one embodiment, search results 508 may be shown below the filters. Further, in one embodiment attributes shown with the results may be user configurable.

In one embodiment, the user may click on a row for selection of one or more of the nodes associated with that row. Further, as an option a list of context buttons 510 may appear to right of the results 508. In one embodiment, the context buttons 510 may be based on available relationships and containments.

As an example, a user may click on CARD context button 510. In response, the node page may be minimized and a card page 512 may be opened. In one embodiment, nodes selected may be automatically included in a new page. In this example, the search is now a new search for Cards and values may be seeded into this new query (as an "IN"). In this case, a user may either click GO or change the filters.

In one embodiment, the user may select a specific object for display as part of a search query. For example, in this case, the user may select the Card object to search. Accordingly, in one embodiment, an object inspector user interface may be launched showing object details (e.g. attributes, derived attributes, relationships, images, etc.) associated with the search query.

Figure 6:
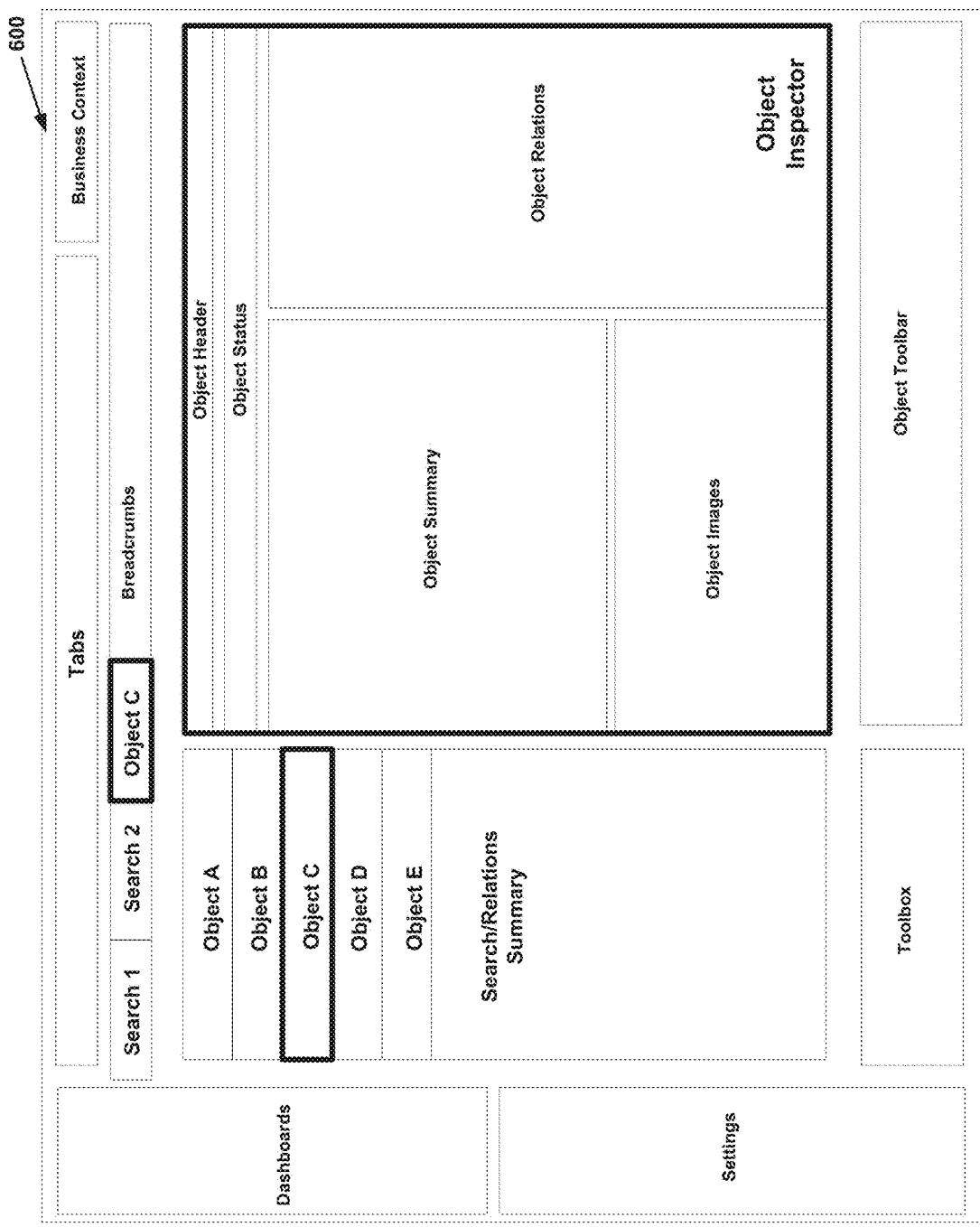
FIG. 6 illustrates an object inspector user interface for metadata-driven search and display, in accordance with one embodiment.

FIG. 6 illustrates an object inspector user interface 600 for metadata-driven search and display, in accordance with one embodiment. As an option, the user interface 600 may be implemented in the context of the details of FIGS. 1-5. Of course, however, the user interface 600 may be implemented in the context of any desired environment. Further, the aforementioned definitions may equally apply to the description below.

As shown, the object inspector user interface 600 may include is a single screen that provides access to all aspects of a specific (single) object. This includes an object's attributes, statuses, and relationships on a single screen. In one embodiment, URL and menu access to additional functionality may also be provided. As an option, the object inspector user interface 600 may be invoked from a search interface (e.g. the search interface of FIG. 5, etc.) to see the details of an object found as search results or that is related to another object.

In one embodiment, related objects may be launched in their own object inspector screens. Further, in one embodiment, breadcrumbs may be persisted for a sequence of searches and object inspector invocations. As an option, breadcrumbs may be used as a shortcut to revert to a previous search result or object. Unlike other implementations of breadcrumbs, reversion to a previous breadcrumb does not wipe out the breadcrumbs after the point chosen, until a different branch is made from that breadcrumb.

In some cases, users may desire to have the ability to hide sensitive data from specific users of the system. For example a contractor for a company may be working on a site repairing equipment. However, because the contractor is not employed directly by the company the contractor may have restricted access to certain attributes or even objects themselves. That information could be a telephone number or a security access code, etc.

Accordingly, in one embodiment, a user may have the ability to configure and determine what attributes/objects will be visible and what attributes/objects will not be visible. In one embodiment, a user preference service interface may be used to perform this configuration. In this case, an end user may have no knowledge that the filtered object or attribute exists.

In another embodiment, a query service interface may be utilized to perform the configuration. In this case, the user may attempt to retrieve attributes that they do not have access to, in which case a NULL value may be returned for that object or attribute. In another embodiment, the user may attempt to retrieve objects that they do not have access permissions to, in which case a standard error message may be returned claiming that the object does not exist. In either case, the attempted access may be logged.

Figure 7:
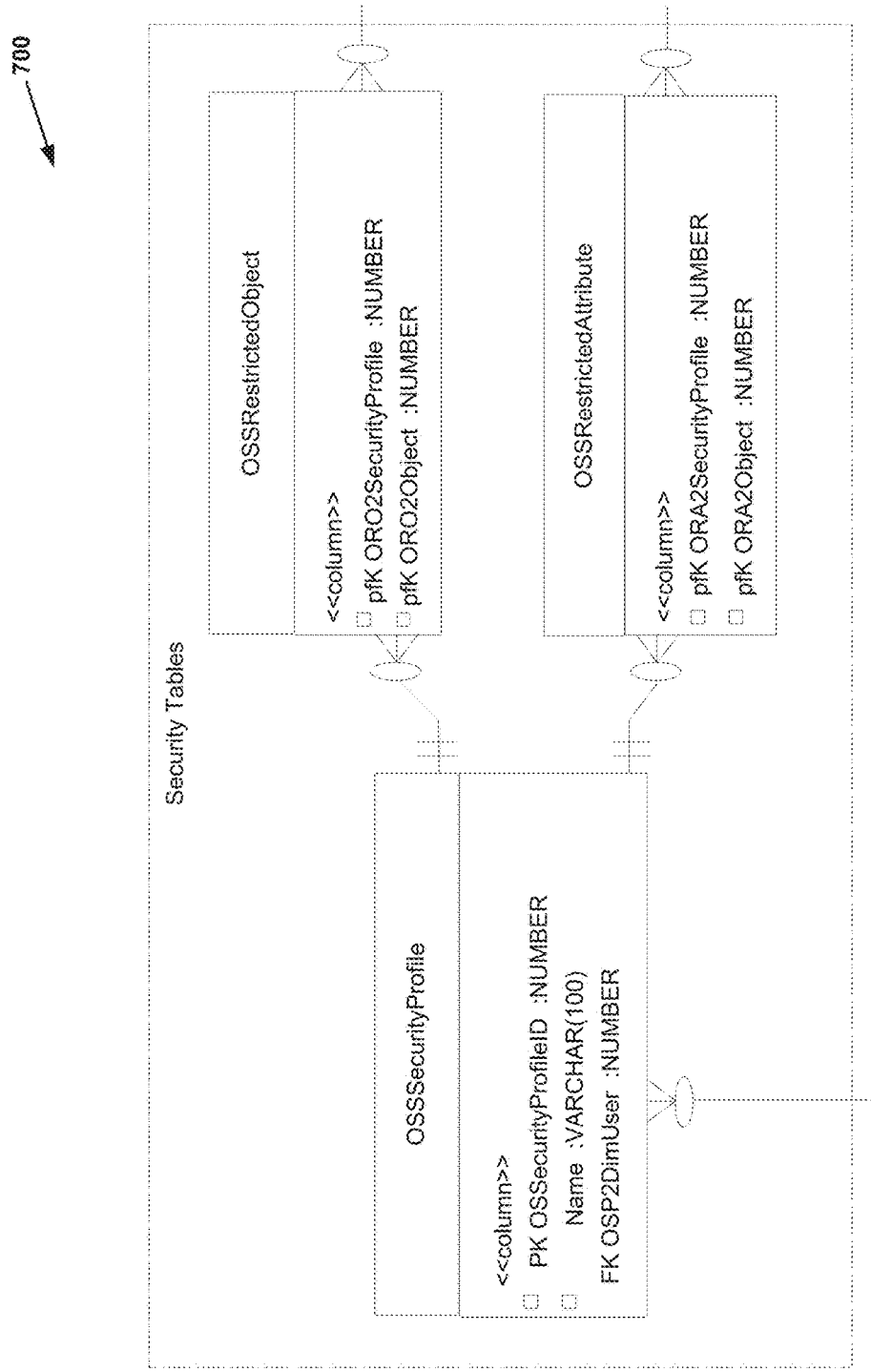
FIG. 7 illustrates metadata model for security in the context of a metadata-driven search and display, in accordance with one embodiment.

FIG. 7 illustrates a metadata model 700 for security in the context of a metadata-driven search and display, in accordance with one embodiment. As an option, the metadata model 700 may be implemented in the context of the details of FIGS. 1-6. Of course, however, the metadata model 700 may be implemented in the context of any desired environment. Further, the aforementioned definitions may equally apply to the description below.

In one embodiment, objects, attributes, and relationships may be restricted by filtering the chosen search criteria, and filtering the result set, utilizing the metadata model 700. In one embodiment, a blacklist of prohibited values of objects and attributes may be implemented. In another embodiment, a white list of allowed values may be implemented. An implementation restricting relationships may utilize the same technique. In one embodiment, the security profile may be related to a user's role.

In one embodiment, the metadata model 700 may be utilized to ensure that all meta-model services that have to do with returning any of an object, object attribute, and object relationship will use security based SQL filters to retrieve the relevant data for the user. For example, to retrieve all the objects that the user has access, the following SQL may be used:

```
select      o.ID
from        Oblect o
where       not exists (select 1
            from        RoleRestrictedObjects rro
            where       rro.ObjectID = o.ID
            and         rro.RoleID in (:UserRoles))
``` where UserRoles is the collection of role IDs that the current user is assigned.

Similarly, the following query may be used to get the attributes for an Object:

```
select      oa.ID
from        ObjectAttribute oa
where       oa.ObjectID = :ObjectID
            and not exists
                (select     1
                from        RoleRestrictedAttributes rra
                where       rra.AttributeID = oa. ID
                and         rra.RoleID in (:UserRoles))
```

In both cases it may be assumed that there is a unidirectional one-to-many relationship between the object and the user (as well as between "ObjectAttribute" and the user) using an ObjectAccess (AttributeAccess) as a join table.

In one embodiment, a query builder may function to validate query parameters before it proceeds to building the query. The validation process may use meta-model data. Provided the security credentials are forwarded properly through to the layer which queries the meta-model, the validation may be performed against the user's metadata.

In one embodiment, search results may be personalized, starting from a chosen display set. This allows a user to set up and save display and search settings. For example, the search meta-model may include filtering of results according to a defined display set of preferences of visible objects, attributes, and/or relations, as shown in FIG. 8.

Figure 8:
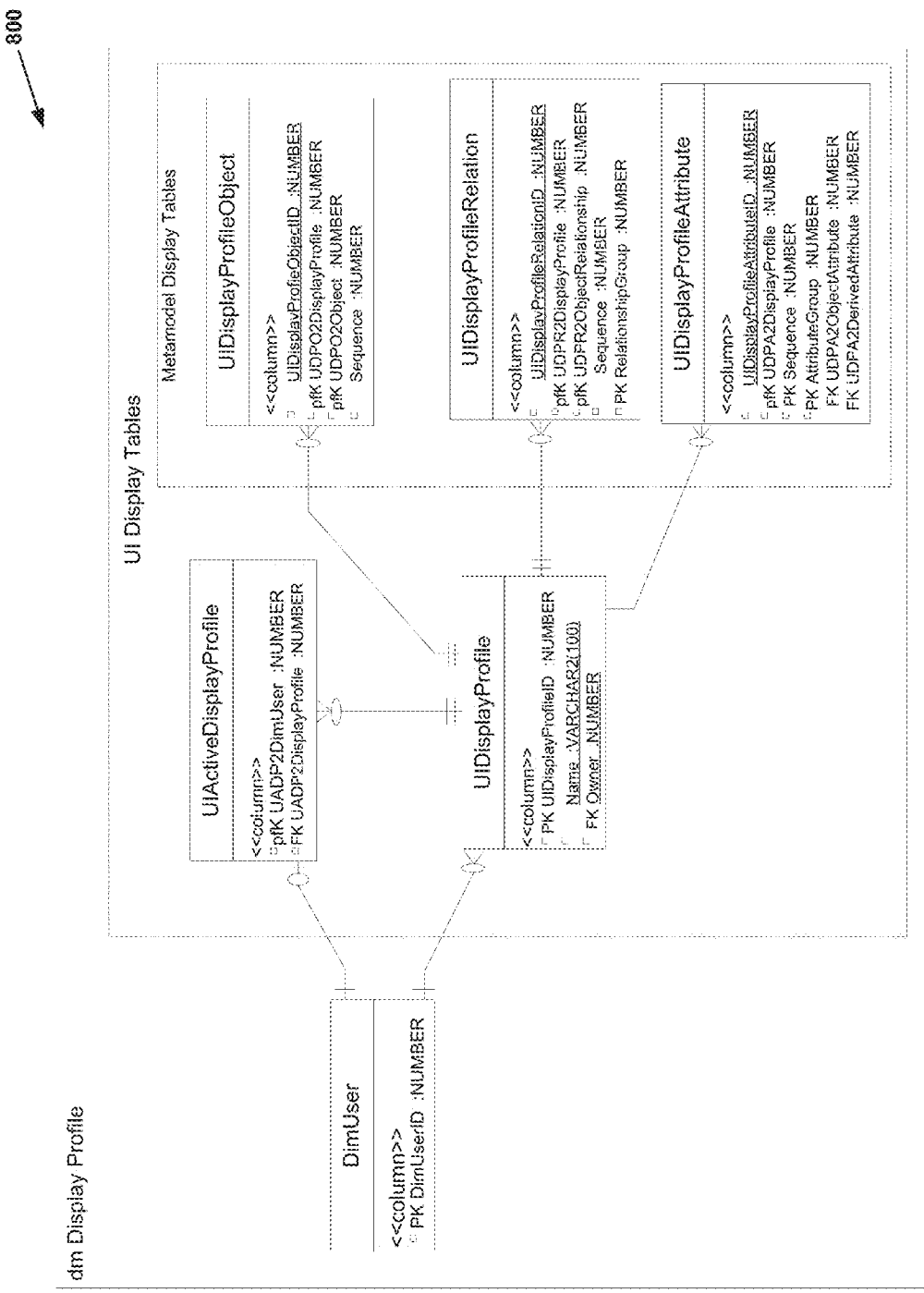
FIG. 8 illustrates a metadata model for filtering search results based on user preference, in accordance with one embodiment.

FIG. 8 illustrates a metadata model 800 for filtering search results based on user preference, in accordance with one embodiment. As an option, the metadata model 800 may be implemented in the context of the details of FIGS. 1-7. Of course, however, the metadata model 800 may be implemented in the context of any desired environment. Further, the aforementioned definitions may equally apply to the description below.

In one embodiment, the metadata model 800 may include a profile that is a stored display set of preferences used as a template for a user. A user may have more than one display set of preferences (e.g. with only one active at a given time, etc.). In one embodiment, a user may set up a number of display sets using a user interface as shown in FIG. 9.

Figure 9:
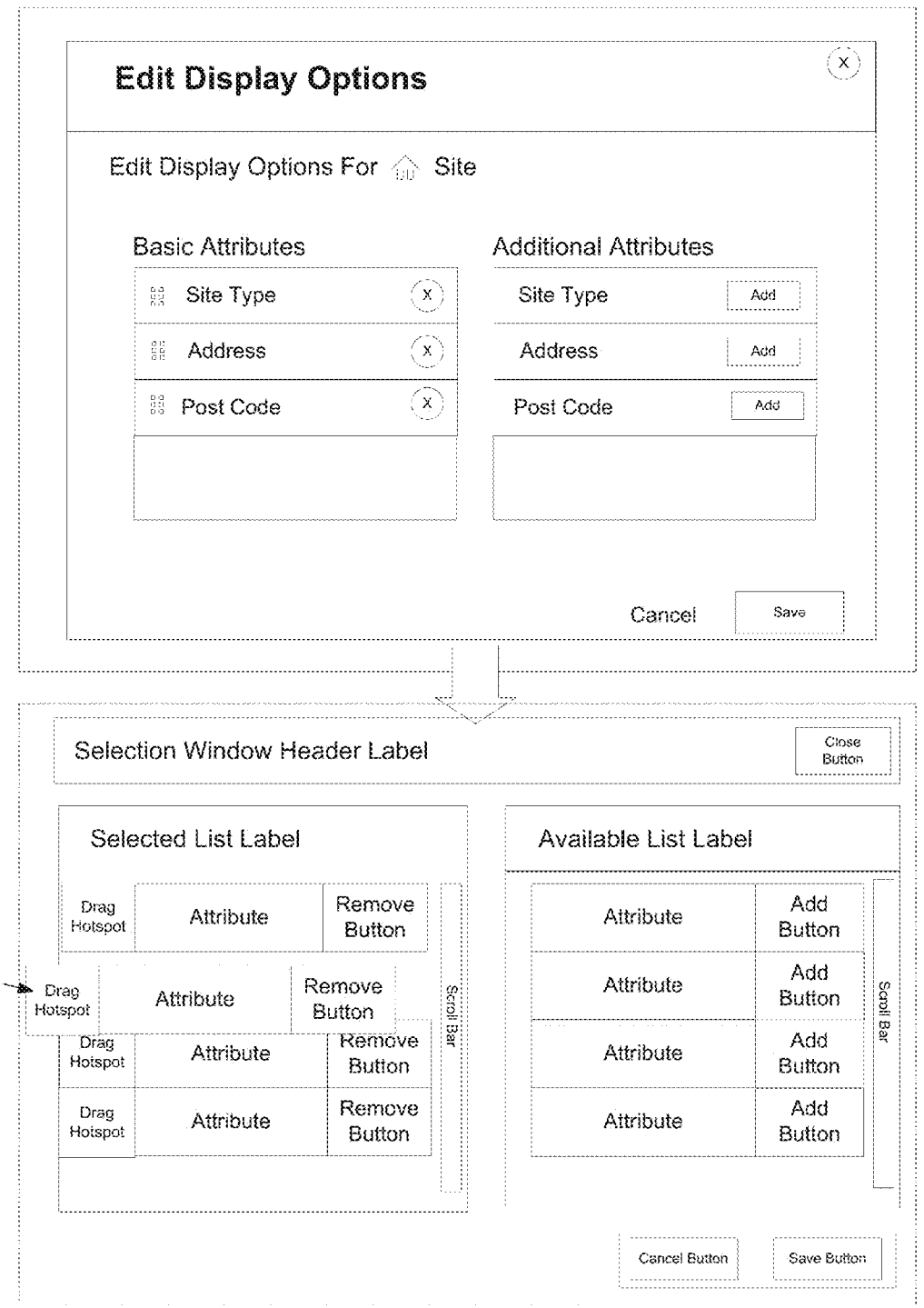
FIG. 9 illustrates a user interface for setting user display preferences, in accordance with one embodiment.

FIG. 9 illustrates a user interface 900 for setting user display preferences, in accordance with one embodiment. As an option, the user interface 900 may be implemented in the context of the details of FIGS. 1-8. Of course, however, the user interface 900 may be implemented in the context of any desired environment. Further, the aforementioned definitions may equally apply to the description below.

In use, a user may use the interface 900 to choose display attributes associated with a search query interface. A user may set up a number of display sets using the user interface 900. In one embodiment, these may be associated with either a user or a role. This may function to offer an initial selection of profiles from which a user may choose.

In various embodiments, users may have access to system-wide profiles, profiles set up for their roles, and/or their own custom profile (e.g. only one of these may be active per user, etc.). In one embodiment, a user may change which profile is active. The users may also choose to change one of the sections to be that of another display set.

For example, User 1 may change just the data display configuration from simple resources to planning resources. In this case, the object inspector setup may remain the same. As another example, User 2 may change the object inspector setup from a screen that does not display images or related objects to a screen that does. In this case, the data display selection may remain the same.

In one embodiment, if the user elects to change just a single part of the display set, then this may adjust a custom profile and the custom profile may be made active for the user. Additionally, if a new user decides to change just the data display configuration, then a new custom display set may be created for the user (and made active) with the data display from the newly chosen display set and the object inspector from the original display set.

Further, if an experienced user decides to change just the object inspector configuration to one from a role display set, then an existing custom profile may be made active and become set to the data display from the current display set and the object inspector from the newly chosen display set. Still yet, if the user elects to change an active display set completely, from a custom profile to a preconfigured profile, then the preconfigured profile may become active for that user. In this case, the custom profile may be left unchanged such that the user may revert back to it.

In one embodiment, an administrator may elect to add a derived attribute to an object, to extend the information available to users.

Figure 10:
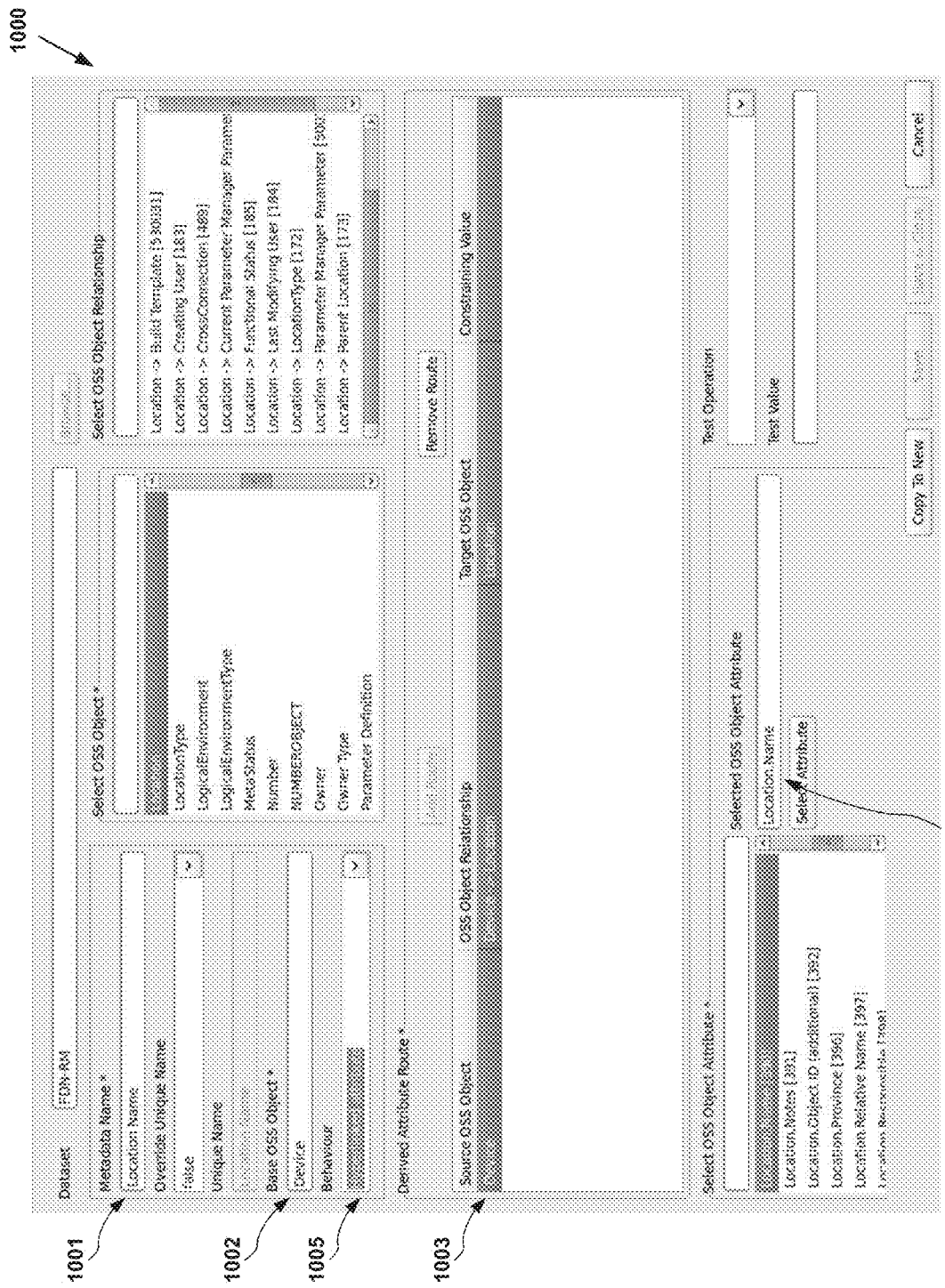
FIG. 10 illustrates a user interface for configuring "derived" attributes by adding an attribute of one object to another object, in accordance with one embodiment.

FIG. 10 illustrates a user interface 1000 for configuring a derived attribute. An administrator can set up any number of derived attributes for any object.

Further, the administrator can set the name of the derived attribute 1001, which object it extends 1002, which attribute is targeted 1004 and which relationships are to be used to get from the base object to the target object 1003.

Further, the administrator may choose to use the attribute in a more complex way that simply aggregating the attribute from one object to another. This can be done by changing the behavior of the derived attribute 1005. This may include, but is not limited to, checking to see if data exists, testing the attribute, other simple SQL supported operations or more complex operations.

In one embodiment, users are hidden from the fact that a given attribute is a normal or a derived attribute.

Figure 11:
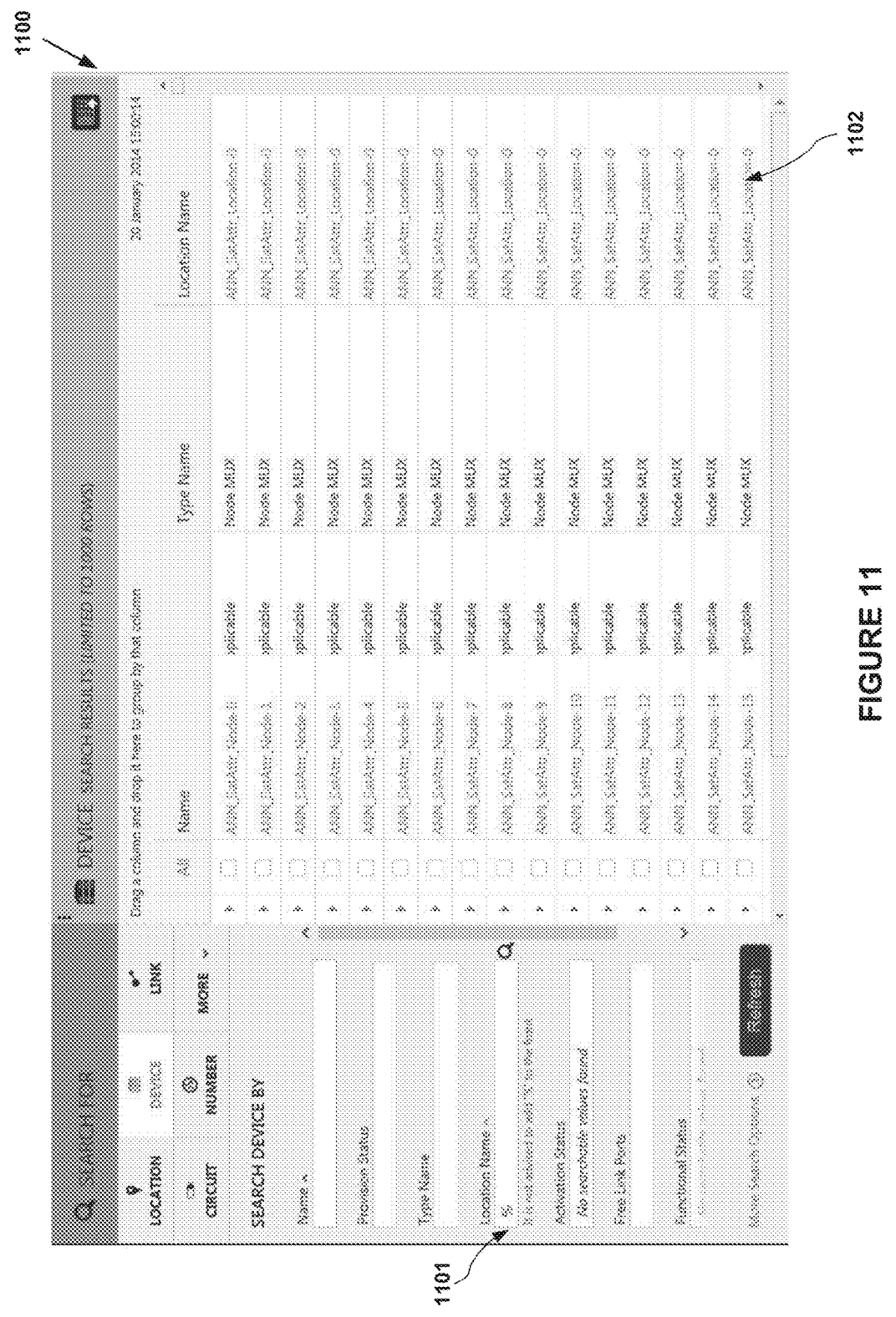

FIG. 11 illustrates a user interface for search 1100 where a derived attribute is mixed in with normal attributes both for search criteria 1101 and for search results 1102.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for identifying a plurality of data objects stored in one or more databases;
   computer code for identifying a plurality of attributes associated with each of the plurality of data objects, including for each of the plurality of data objects:
     retrieving from the one or more databases a first subset of attributes for the data object that are stored in association with the data object, and
     deriving a second subset of attributes for the data object that are not stored in association with the data object, wherein at least one attribute in the second set of attributes is derived by being taken from another data object related to the data object;
   computer code for identifying a plurality of relationships associated with each of the plurality of data objects;
   computer code for filtering the plurality of data objects, the plurality of attributes, and the plurality of relationships based on predefined criteria to generate a first subset of data objects, a first subset of attributes, and a first subset of relationships;
   computer code for allowing a user to access, through a user interface, at least a metadata representation of the first subset of data objects, the first subset of attributes, and the first subset of relationships, and receiving a selection from the user through the user interface, including:
     (a) presenting, in a first window, a list of object classes,
     (b) receiving, from the user through the first window, a selection of one of the presented object classes,
     (c) in response to the selection in (b), presenting through the first window a list of selectable attributes from the first subset of attributes,
     (d) receiving, from the user through the first window, a selection of one or more of the presented attributes,
     (e) executing a search based on the selected object class and the selected one or more attributes,
     (f) presenting, through the first window, results of the executed search including objects of the first subset of data objects that are of the selected object class and that have the selected one or more attributes, the results being presented with a list of context buttons that are based on available relationships of the first subset of relationships that are with the objects presented as the results,
     (g) receiving, from the user through the first window, a selection of one of the objects presented as the results and a selection of one of the context buttons, and
     (h) presenting, in a second window, the selected object with the relationship associated with the selected context button being presented as filtering criteria;
   computer code for automatically generating a search query based on the selected object and the relationship from (h);
   computer code for searching the one or more databases utilizing the search query; and
   computer code for displaying results of the search query utilizing the user interface.

2. The computer program product of claim 1, wherein the computer program product is operable such that the plurality of relationships associated with each of the plurality of data objects includes a relationship between a first data object of the plurality of data objects and a second data object of the plurality of data objects.

3. The computer program product of claim 1, wherein the computer program product is operable such that an origin of the identified plurality of attributes is indistinguishable.

4. The computer program product of claim 1, wherein the predefined criteria includes a user preference.

5. The computer program product of claim 1, wherein the predefined criteria includes user defined criteria.

6. The computer program product of claim 1, wherein the predefined criteria includes a whitelist or blacklist.

7. The computer program product of claim 1, further comprising computer code for displaying the results of the search query in a selectable format utilizing the user interface.

8. The computer program product of claim 7, further comprising computer code for receiving a selection of one of the results of the search query in the selectable format utilizing the user interface.

9. The computer program product of claim 8, further comprising computer code for displaying additional information associated with the selected result of the search query.

10. The computer program product of claim 1, wherein the computer program product is operable such that the user interface is configurable and the results of the search query are based on a user defined preference.

11. A method, comprising:
    identifying a plurality of data objects stored in one or more databases;
    identifying a plurality of attributes associated with each of the plurality of data objects, including for each of the plurality of data objects:
      retrieving from the one or more databases a first subset of attributes for the data object that are stored in association with the data object, and
      deriving a second subset of attributes for the data object that are not stored in association with the data object, wherein at least one attribute in the second set of attributes is derived by being taken from another data object related to the data object;
    identifying a plurality of relationships associated with each of the plurality of data objects;
    filtering the plurality of data objects, the plurality of attributes, and the plurality of relationships based on predefined criteria to generate a first subset of data objects, a first subset of attributes, and a first subset of relationships;

allowing a user to access, through a user interface, at least a metadata representation of the first subset of data objects, the first subset of attributes, and the first subset of relationships, and receiving a selection from the user through the user interface, including:
- (a) presenting, in a first window, a list of object classes,
- (b) receiving, from the user through the first window, a selection of one of the presented object classes,
- (c) in response to the selection in (b), presenting through the first window a list of selectable attributes from the first subset of attributes,
- (d) receiving, from the user through the first window, a selection of one or more of the presented attributes,
- (e) executing a search based on the selected object class and the selected one or more attributes,
- (f) presenting, through the first window, results of the executed search including objects of the first subset of data objects that are of the selected object class and that have the selected one or more attributes, the results being presented with a list of context buttons that are based on available relationships of the first subset of relationships that are with the objects presented as the results,
- (g) receiving, from the user through the first window, a selection of one of the objects presented as the results and a selection of one of the context buttons, and
- (h) presenting, in a second window, the selected object with the relationship associated with the selected context button being presented as filtering criteria, automatically generating a search query based on the selected object and the relationship from (h);

searching the one or more databases utilizing the search query; and displaying results of the search query utilizing the user interface.

12. A system comprising:

a memory system; and one or more processing cores coupled to the memory system and that are each configured to:

identify a plurality of data objects stored in one or more databases;

identify a plurality of attributes associated with each of the plurality of data objects, including for each of the plurality of data objects:
- retrieving from the one or more databases a first subset of attributes for the data object that are stored in association with the data object, and
- deriving a second subset of attributes for the data object that are not stored in association with the data object, wherein at least one attribute in the second set of attributes is derived by being taken from another data object related to the data object;

identify a plurality of relationships associated with each of the plurality of data objects;

filter the plurality of data objects, the plurality of attributes, and the plurality of relationships based on predefined criteria to generate a first subset of data objects, a first subset of attributes, and a first subset of relationships;

allow a user to access, through a user interface, at least a metadata representation of the first subset of data objects, the first subset of attributes, and the first subset of relationships, and receive a selection from the user through the user interface, including:
- (a) presenting, in a first window, a list of object classes,
- (b) receiving, from the user through the first window, a selection of one of the presented object classes,
- (c) in response to the selection in (b), presenting through the first window a list of selectable attributes from the first subset of attributes,
- (d) receiving, from the user through the first window, a selection of one or more of the presented attributes,
- (e) executing a search based on the selected object class and the selected one or more attributes,
- (f) presenting, through the first window, results of the executed search including objects of the first subset of data objects that are of the selected object class and that have the selected one or more attributes, the results being presented with a list of context buttons that are based on available relationships of the first subset of relationships that are with the objects presented as the results,
- (g) receiving, from the user through the first window, a selection of one of the objects presented as the results and a selection of one of the context buttons, and
- (h) presenting, in a second window, the selected object with the relationship associated with the selected context button being presented as filtering criteria;

automatically generate a search query based on the selected object and the relationship from (h);

search the one or more databases utilizing the search query; and display results of the search query utilizing the user interface.

13. The computer program product of claim 1, wherein the second set of attributes are derived on the fly.

14. The computer program product of claim 1, wherein at least one attribute in the second set of attributes for the data object is derived by transforming a name/value pair into a simple attribute.

* * * * *